(12) United States Patent
Falahati et al.

(10) Patent No.: US 12,225,545 B2
(45) Date of Patent: Feb. 11, 2025

(54) DATA TRANSMISSIONS IN CONTROL REGIONS

(71) Applicant: Telefonaktiebolaget LM Ericsson (publ), Stockholm (SE)

(72) Inventors: Sorour Falahati, Stockholm (SE); Robert Baldemair, Solna (SE); Jung-Fu Cheng, Fremont, CA (US); Carola Faronius, Järfälla (SE); Havish Koorapaty, Saratoga, CA (US); Fredrik Ovesjö, Älvsjö (SE); Stefan Parkvall, Bromma (SE); Christian Skärby, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 313 days.

(21) Appl. No.: 17/838,515

(22) Filed: Jun. 13, 2022

(65) Prior Publication Data

US 2022/0377716 A1 Nov. 24, 2022

Related U.S. Application Data

(63) Continuation of application No. 16/483,779, filed as application No. PCT/IB2018/050739 on Feb. 6, 2018, now Pat. No. 11,395,279.

(Continued)

(51) Int. Cl.
*H04L 5/00* (2006.01)
*H04W 72/04* (2023.01)
(Continued)

(52) U.S. Cl.
CPC ............ *H04W 72/23* (2023.01); *H04L 5/0053* (2013.01); *H04W 72/0446* (2013.01); *H04W 72/0453* (2013.01)

(58) Field of Classification Search
CPC ... H04L 5/0007; H04L 5/0044; H04L 5/0053; H04L 5/0091; H04W 72/0446; H04W 72/0453; H04W 72/23; H04W 72/232
See application file for complete search history.

(56) References Cited

U.S. PATENT DOCUMENTS

2009/0257390 A1* 10/2009 Ji ........................ H04W 72/541
370/329
2011/0268064 A1 11/2011 Chen et al.
(Continued)

FOREIGN PATENT DOCUMENTS

CN 101841851 A 9/2010
CN 102415185 A 4/2012
(Continued)

OTHER PUBLICATIONS

Rejection Decision issued by the China National Intellectual Property Administration for Application No. 201880010463.2—Mar. 25, 2022.
(Continued)

*Primary Examiner* — Melvin C Marcelo
*Assistant Examiner* — Natali Pascual Peguero
(74) *Attorney, Agent, or Firm* — Baker Botts L.L.P.

(57) ABSTRACT

According to some embodiments, a method in a wireless device comprises: receiving a control channel (e.g., physical downlink control channel (PDCCH)) that includes control information that indicates a set of time and frequency resources allocated for the wireless device to receive a data transmission; determining that the set of time and frequency resources allocated for data transmission overlaps with a control resource region (e.g., control resource set (CORESET)); and receiving the data transmission in the set of time and frequency resources allocated for data transmission. The control information may include a bitmap that indicates at (Continued)

one or more groups of time and frequency resources excluded/included for the data transmission region.

19 Claims, 13 Drawing Sheets

Related U.S. Application Data

(60) Provisional application No. 62/455,508, filed on Feb. 6, 2017.

(51) Int. Cl.
*H04W 72/0446* (2023.01)
*H04W 72/0453* (2023.01)
*H04W 72/23* (2023.01)

(56) References Cited

U.S. PATENT DOCUMENTS

| | | |
|---|---|---|
| 2012/0320846 A1 | 12/2012 | Papasakellariou et al. |
| 2013/0094458 A1 | 4/2013 | Sartori et al. |
| 2016/0308648 A1* | 10/2016 | Li .................. H04W 72/00 |
| 2019/0268889 A1 | 8/2019 | Kim et al. |

FOREIGN PATENT DOCUMENTS

| | | |
|---|---|---|
| CN | 104012121 A | 8/2014 |
| CN | 104661309 A | 5/2015 |
| EP | 2 705 626 A1 | 3/2014 |
| EP | 3 059 876 A1 | 8/2016 |
| JP | 2015 529022 A | 10/2015 |

OTHER PUBLICATIONS

JP Notice of Allowance issued for Japanese Patent Application No. 2019-539821—Dec. 13, 2021.
3GPP TSG-RAN WG1 #88, Athens, Greece; Source: Ericsson; Title: On Data Transmission on Control Resource Set (R1-1703289)—Feb. 13-17, 2017.
CN Office Action issued for Application No. 201880010463.2—Dec. 24, 2021.
Japanese Office Action issued for Patent Application No. 2019-539821—Jun. 4, 2021.
Korean Notice of Preliminary Rejection issued for Patent Application No. 2019-7025769—Sep. 18, 2020.
3GPP TSG RAN WG1 NR Ad Hoc Meeting; Spokane, USA; Source: Huawei, HiSilicon; Title: Dynamic resource multiplexing of downlink control and data (R1-1700397)—Jan. 16-20, 2017.
3GPP TSG RAN WG1 Nr Ad-Hoc Meeting; Spokane, USA; Source: Guangdon OPPO Mobile Telecom; Title: Views on DL control channel for NR (R1-1700562)—Jan. 16-20, 2017.
3GPP TSG RAN WG1 NR Ad Hoc Meeting; Spokane, USA; Source: Sharp; Title: DL Control Channel and data multiplexing in NR (R1-1700733)—Jan. 16-20, 2017.
Communication Pursuant To Article 94(3) EPC issued for Application No. 18 705 988.6—1205—Feb. 22, 2021.
Examination Report issued by the Government of India, Intellectual Property India for Application No. 201947035063—Oct. 27, 2020.
PCT International Search Report for International application No. PCT/IB2018/050739—Apr. 16, 2018.
PCT Written Opinion of the International Searching Authority for International application No. PCT/IB2018/050739—Apr. 16, 2018.
Extended European Search Report issued for Application No./ Patent No. 22180176.4-1012—Sep. 20, 2022.

* cited by examiner

DATA TRANSMISSIONS IN CONTROL REGIONS

PRIORITY

This nonprovisional application is a continuation, under 35 U.S.C. § 120, of U.S. patent application Ser. No. 16/483,779 filed on Aug. 6, 2019, which is a U.S. National Stage Filing under 35 U.S.C. § 371 of International Patent Application Serial No. PCT/IB2018/050739 filed Feb. 6, 2018, and entitled "Data Transmissions in Control Regions" which claims priority to U.S. Provisional Patent Application No. 62/455,508 filed Feb. 6, 2017, all of which are hereby incorporated by reference in their entirety.

TECHNICAL FIELD

Particular embodiments are directed to wireless communications and, more particularly, to transmission of user data in a control region.

BACKGROUND

Third Generation Partnership Project (3GPP) fifth generation (5G) New Radio (NR) systems use physical downlink control channels (PDCCHs) for downlink control information (DCI), e.g., downlink scheduling assignments and uplink scheduling grants. The PDCCHs are in general transmitted at the beginning of a slot and relate to data in the same or a later slot (for mini-slots PDCCH can also be transmitted within a regular slot). Different formats (sizes) of the PDCCHs are possible to handle different DCI payload sizes and different aggregation levels (i.e., different code rate for a given payload size).

A user equipment (UE) is configured (implicitly and/or explicitly) to blindly monitor (or search) for a number of PDCCH candidates of different aggregation levels and DCI payload sizes. Upon detecting a valid DCI message (i.e., the decoding of a candidate is successful, and the DCC contains an identity (ID) the UP is to monitor) the UE follows the DCI (e.g., receives the corresponding downlink data or transmits in the uplink). The blind decoding process comes at a cost in complexity in the UE but is required to provide flexible scheduling and handling of different DCI payload sizes.

NR includes specifications on how to configure control resource regions where the UE can monitor for PDCCH transmissions and how a UE can be configured with multiple control resource regions. Some of these control regions may be used for sending common control messages that are intended for multiple UEs and some may be intended for UE-specific control messages. A control region may serve both common and LTE-specific control messages. One difference in NR from long term evolution (LTE) is that the carrier bandwidths may be larger. Thus, there are benefits if the control region does not span the entire bandwidth of the carrier. Therefore, control regions may be limited in time and in frequency.

Control regions are generally dimensioned to ensure that multiple UEs can be signaled within the region. To do this, statistical multiplexing may be used where the number of UEs that are assigned to a control region to search for control messages is much greater than the resource available in the control region. Therefore, the search spaces for different UEs are randomized so that statistical multiplexing can be used to minimize the blocking probability when any particular UE needs to be scheduled. Therefore, control regions may be dimensioned to be able to signal PDCCHs for multiple UEs simultaneously and the number of UEs that are assigned to monitor the control region is expected to be greater than the number of UEs that can simultaneously be signaled.

Furthermore, a UE may be configured with one or more control regions, which the UE monitors for the potential reception of one or more PDCCHs. The control regions for one UE or different UEs can, in principle, partly or fully overlap.

Existing solutions do not adequately handle situations where a UE is configured with multiple control regions. They also do not optimize signaling complexity for various desired options to reuse control resources.

SUMMARY

The embodiments described herein include signaling to the user equipment (UE) on three aspects that inform the UE how control region resource should be reused. These are the starting position of the data transmission, the physical resource blocks in frequency that are used for data transmission and options on how to reuse unused resources in the one or more control regions configured to the UE including the option of not reusing any unused resources in the control regions.

Particular embodiments optimize the overhead of such signaling by using a field with as few bits as possible and encoding the values for the field with specific options or reuse of control resources as defined by the above three aspects. Particular embodiments enable data transmissions that need to be sent urgently with very low latency to occur purely in one or more of the control regions defined for the UE.

According to some embodiments, a method in a network node comprises determining one or more control resource regions (e.g., control resource set (CORESET)) for a carrier. Each control resource region of the one or more control resource regions comprises a set of time and frequency resources. The method further comprises determining a control channel region (e.g., physical downlink control channel (PDCCH)) in a first control resource region of the one or more control resource regions. The control channel region may comprise a subset of the time frequency resources of the first control resource region. The method further comprises determining a data transmission region in at least one control resource region of the one or more control resource regions, and signaling the determined data transmission region to a wireless device.

In particular embodiments, the data transmission region comprises a subset of the resources in the at least one control resource region. The data transmission region may exclude resources for the control channel region.

In particular embodiments, the data transmission region comprises resources within the at least one control resource region and resources outside of any of the one or more control resource regions. A frequency range of resources within the at least one control resource region may be the same as a frequency range of the resources outside of any of the one or more control resource regions, or the frequency range may be different than the frequency range of the resources outside of any of the one or more control resource regions.

In particular embodiments, the data transmission region excludes resources outside of the at least one control resource region. The data transmission region may comprise all resources in the at least one control resource region.

In particular embodiments, signaling the determined data transmission region to the wireless device comprises signaling a bitmap. The bitmap indicates at least one of: one or more groups of time and frequency resources used for the data transmission region; and one or more groups of time and frequency resources excluded from the data transmission region, in particular embodiments, signaling the determined data transmission region to the wireless device comprises signaling an identifier of at least one control resource region. The identifier of the at least one control resource region indicates at least one of: a control resource region used for the data transmission region, and a control resource region excluded from the data transmission region.

According to some embodiments, a network node comprises processing circuitry. The processing circuitry is operable to determine one or more control resource regions (e.g., CORESET) for a carrier. Each control resource region of the one or more control resource regions comprises a set of time and frequency resources. The processing circuitry is further operable to determine a control channel region (e.g., PDCCH) in a first control resource region of the one or more control resource regions. The control channel region may comprise a subset of the time frequency resources of the first control resource region. The processing circuitry is further operable to determine a data transmission region in at least one control resource region of the one or more control resource regions, and signal the determined data transmission region to a wireless device.

In particular embodiments, the data transmission region comprises a subset of the resources in the at least one control resource region. The data transmission region may exclude resources for the control channel region.

In particular embodiments, the data transmission region comprises resources within the at least one control resource region and resources outside of any of the one or more control resource regions. A frequency range of resources within the at least one control resource region may be the same as a frequency range of the resources outside of any of the one or more control resource regions, or the frequency range may be different than the frequency range of the resources outside of any of the one or more control resource regions.

In particular embodiments, the data transmission region excludes resources outside of the at least one control resource region. The data transmission region may comprise all resources in the at least one control resource region.

In particular embodiments, the processing circuitry is operable to signal the determined data transmission region to the wireless device by signaling a bitmap. The bitmap indicates at least one of: one or more groups of time and frequency resources used for the data transmission region; and one or more groups of time and frequency resources excluded from the data transmission region.

In particular embodiments, the processing circuitry is operable to signal the determined data transmission region to the wireless device by signaling an identifier of at least one control resource region. The identifier of the at least one control resource region indicates at least one of: a control resource region used for the data transmission region, and a control resource region excluded from the data transmission region.

According to some embodiments, a method in a wireless device comprises: receiving a control channel (e.g., PDCCH) that includes control information that indicates a set of time and frequency resources allocated for the wireless device to receive a data transmission; determining that the set of time and frequency resources allocated for data transmission overlaps with a control resource region (e.g., CORESET), and receiving the data transmission in the set of time and frequency resources allocated for data transmission.

In particular embodiments, the set of time and frequency resources allocated for data transmission comprises a subset of the resources in the control resource region. The set of time and frequency resources allocated for data transmission may exclude resources used for a control channel.

In particular embodiments, the set of time and frequency resources allocated for data transmission comprises resource within the control resource region and resources outside of any control resource regions. A frequency range of resources within the at least one control resource region may be the same as a frequency range of the resources outside of any of the one or more control resource regions, or the frequency range may be different than the frequency range of the resources outside of any of the one or more control resource regions.

In particular embodiments, the set of time and frequency resources allocated for data transmission excludes resources outside of the control resource region. The set of time and frequency resources allocated for data transmission may comprise all resources in the control resource region.

In particular embodiments, the control information includes a bitmap. The bitmap indicates at least one of: one or more groups of time and frequency resources used for the data transmission region; and one or more groups of time and frequency resources excluded from the data transmission region.

In particular embodiments, the control information includes an identifier of at least one control resource region. The identifier of the at least one control resource region indicates at least one of: a control resource region used for the data transmission, and a control resource region excluded from the data transmission.

According to some embodiments, a wireless device comprises processing circuitry. The processing circuitry is operable to; receive a control channel that includes control information that indicates of a set of time and frequency resources allocated for the wireless device to receive a data transmission; determine that the set of time and frequency resources allocated for data transmission overlaps with a control resource region; and receive the data transmission in the set of time and frequency resources allocated for data transmission.

According to some embodiments, a network node comprises a determining module and a signaling module. The determining module is operable to: determine one or more control resource regions for a carrier. Each control resource region of the one or more control resource regions may comprise a set of time and frequency resources. The determining module is further operable to: determine a control channel region in a first control resource region of the one or more control resource regions, and determine a data transmission region in at least one control resource region of the one or more control resource regions. The signaling module is operable to signal the determined data transmission region to a wireless device.

According to some embodiments, a wireless device comprises a receiving module and a determining module. The receiving module is operable to receive a control channel that includes control information that indicates of a set of time and frequency resources allocated for the wireless device to receive a data transmission. The determining module is operable to determine that the set of time and frequency resources allocated for data transmission overlaps with a control resource region. The receiving module is further operable to receive the data transmission in the set of time and frequency resources allocated for data transmission.

Also disclosed is a computer program product. The computer program product comprises instructions stored on non-transient computer-readable media which, when executed by a processor, perform the steps of: determining one or more control resource regions for a carrier; determining a control channel region in a first control resource region of the one or more control resource regions; determining a data transmission region in at least one control resource region of the one or more control resource regions, and signaling the determined data transmission region to a wireless device.

Another computer program product comprises instructions stored on non-transient computer-readable media which, when executed by a processor, perform the steps of; receiving a control channel that includes control information that indicates a set of time and frequency resources allocated for the wireless device to receive a data transmission; determining that the set of time and frequency resources allocated for data transmission overlaps with a control resource region; and receiving the data transmission in the set of time and frequency resources allocated for data transmission.

Particular embodiments may exhibit some of the following technical advantages. For example, particular embodiments provide a flexible way of maximizing data throughput by reusing unused resources in configured control regions. Particular embodiments provide a robust method for enabling low latency transmissions to be multiplexed with data transmissions. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
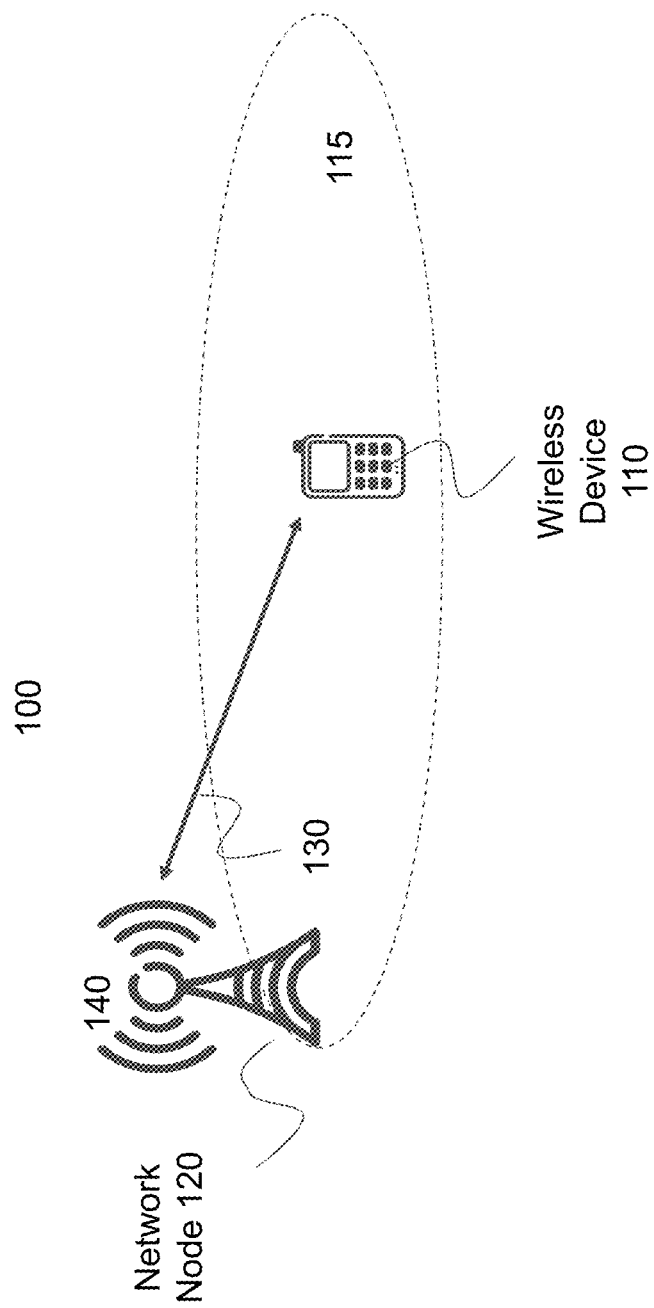
FIG. 1 is a block diagram illustrating an example wireless network, according to some embodiments.

Third Generation Partnership Project (3GPP) fifth generation (5G) New Radio (NR) includes specifications on how to configure control resource regions where a user equipment (GE) can monitor for physical downlink control channel (PDCCH) transmissions and how a. GE can be configured with multiple control resource regions. Some of these control regions may be used for sending common control messages that are intended for multiple UEs and some may be intended for GE-specific control messages. A control region may serve both common and UE-specific control messages. One difference in NR from long term evolution (DIE) is that the carrier bandwidths may be larger. Thus, there are benefits seen in the control region not spanning the entire bandwidth of the carrier. Therefore, control regions may be limited in time and in frequency.

Control regions are generally dimensioned to ensure that multiple UEs can be signaled within the region. The search spaces for different UEs are randomized so that statistical multiplexing can be used to minimize the blocking probability when any particular GE needs to be scheduled. In low load conditions, however, there may often be only one or two UEs that are sent PDCCHs in a control region. These UEs may have data transmitted in the remaining parts of the slot outside of the control region. In this situation, unused resources within the control region are wasted. Therefore reuse of the unused resources in the control region for data transmission to the scheduled UEs is desirable.

A CORESET is a control resource set that is configured to the GE. A CORESET is a set of REs that spans a set of physical resource blocks (PRBs) in frequency and orthogonal frequency division multiplexing (OFDM) symbols in time. A UE may be configured one or more CORESETs which the UE should monitor for the potential reception of one or more PDCCHs. CORESETs for one UE or different UEs can in principle be (partly) overlapping. For simplicity, in the figures below it is assumed that the CORESETs are not partly overlapping.

Existing solutions do not adequately deal with situations where a UE is configured with multiple control regions. They also do not optimize signaling complexity for various desired options to reuse control resources.

Particular embodiments obviate the problems described above and include signaling to the UE on three aspects that informs the UE how control region resource should be reused. These are the starting position of the data transmission, the physical resource blocks in frequency that are used for data transmission and options on how to reuse unused resources in the one or more control regions configured to the UE including the option of not reusing any unused resources in the control regions.

Particular embodiments optimize the overhead of such signaling by using a field with as few bits as possible and encoding the values for the field with specific options for reuse of control resources as defined by the above three aspects. Particular embodiments enable data transmissions that must be sent urgently with very low latency to occur purely in one or more of the control regions defined for the UE Particular embodiments provide a flexible way of maximizing data throughput by reusing unused resources in configured control regions. Particular embodiments provide a robust method for enabling low latency transmissions to be multiplexed with data transmissions.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 1-11 of the drawings, like numerals being used for like and corresponding parts of the various drawings. LTE is used throughout this disclosure as an example cellular system, but the ideas presented herein may apply to other wireless communication systems as well.

FIG. 1 is a block diagram illustrating an example wireless network, according to a particular embodiment, Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals, A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter 140 or multiple transmitters 140 for transmitting signals 130 to wireless devices 110. In some embodiments, network node 120 may comprise a multi-input multi-output (MEMO) system. Similarly, each wireless device 110 may have a single receiver or multiple receivers for receiving signals 130 from network nodes 120 or other wireless devices 110.

Wireless signals 130 may include particular time and frequency resources allocated as control resources. The resources may be referred to as a control region. One example of time and frequency resources allocated as control resources is a CORESET. Other embodiments may include other types of control regions.

In some embodiments, network node 120 may determine one or more control resource regions (e.g., control resource set (CORESET)) for a carrier. Each control resource region comprises a set of time and frequency resources (described by physical resource blocks, OFDM symbols, frequency range, etc.). Network node 120 may determine a control channel region (e.g., PDCCH) in a control resource region. The control channel region may comprise a subset of the time frequency resources of the first control resource region. Network node 120 may determine a data transmission region in a control resource region. Network Node 120 may signal the determined data transmission region to wireless device 110.

Network node 120 may signal to wireless device 110 on three aspects that inform wireless device 110 how a control region resource may be reused. These are the starting position of the data transmission, the physical resource blocks in frequency that are used for data transmission, and options on how to reuse unused resources in the one or more control regions configured to wireless device 110, including the option of not reusing any unused resources in the control regions.

In particular embodiments, the data transmission region comprises a subset of the resources in the at least one control resource region. The data transmission region may exclude resources for the control channel region.

In particular embodiments, network node 120 may signal the determined data transmission region to wireless device 110 using a bitmap. The bitmap may indicate time and frequency resources used for the data transmission region, or time and frequency resources excluded from the data transmission region. Other embodiments may use an identifier of at least one control resource region to include or exclude with respect to the data transmission region.

According to some embodiments, wireless device 110 receives a control channel PDCCH) that includes control information that indicates a set of time and frequency resources allocated for the wireless device to receive a data transmission. Wireless device 110 may determine that the set of time and frequency resources allocated for data transmission overlaps with a control resource region (e.g., CORESET). Wireless device 110 may transmit or receive a data transmission in the set of time and frequency resources allocated for data transmission.

Particular methods for using and reusing control resources are described in more detail with respect to FIGS. 2-9.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 10 below. Similarly, a network node may include any suitable combination of hardware and/or software. For example, in particular embodiments, a network node, such as network node 120, may include the components described with respect to FIG. 11 below.

Various embodiments include signaling information. Portions of some signaling may be known, such as that a PDCCH message may indicate the resources in frequency, i.e., the physical resource blocks (PRBs) that are allocated for data transmission to the UE, and that a PDCCH message may indicate a starting symbol for data transmissions. The embodiments described herein, however, also include methods to reuse unused resources in the control resource regions (e.g., CORESETs) configured to the UE for the purpose of data reception and transmission. Although examples herein as described in terms of a CORESET, the examples and embodiments apply to any control resource region, or any other defined resource region.

A first group of embodiments include interpretation of starting symbol for data transmissions. In some embodiments, the starting symbol for data transmissions is applicable only to PRBs that are fully outside any control resource regions (e.g., CORESETs) configured to the UE. That is, unless otherwise indicated by methods outlined in the embodiments below, the UE assumes that the data transmission (PDSCH) is mapped to the REs in time and frequency indicated by the allocated PRBs and the starting symbol, but excluding any REs that are part of control resource regions (e.g., CORESETs) configured to the UE.

A second group of embodiments include control region reuse to avoid resources on which a UE receives a control channel (e.g., PDCCH). The resources in the control resource region that are reused for data transmission do not include the resources on which a PDCCH has been received. In other words, this group of embodiments is similar to the first group of embodiments in the sense that the UE follows the resource allocation given by the starting symbol and RBs in the frequency domain, but instead of excluding all REs in the entire control resource region (e.g., CORESET) from the allocation, only the REs upon which the UE detected a control channel (e.g., PDCCH) are excluded.

A third group of embodiments include control region reuse within a time and frequency region indicated by scheduled PRBs and start symbol for data. The resources in the control region are only reused within the time and frequency region indicated by the scheduled PRBs and start symbol for data. This is illustrated in FIG. 2 where a UE receives a PDCCH in a CORESET, but the UE is scheduled to transmit PRBs only spanning a part of the CORESET bandwidth.

Figure 2:
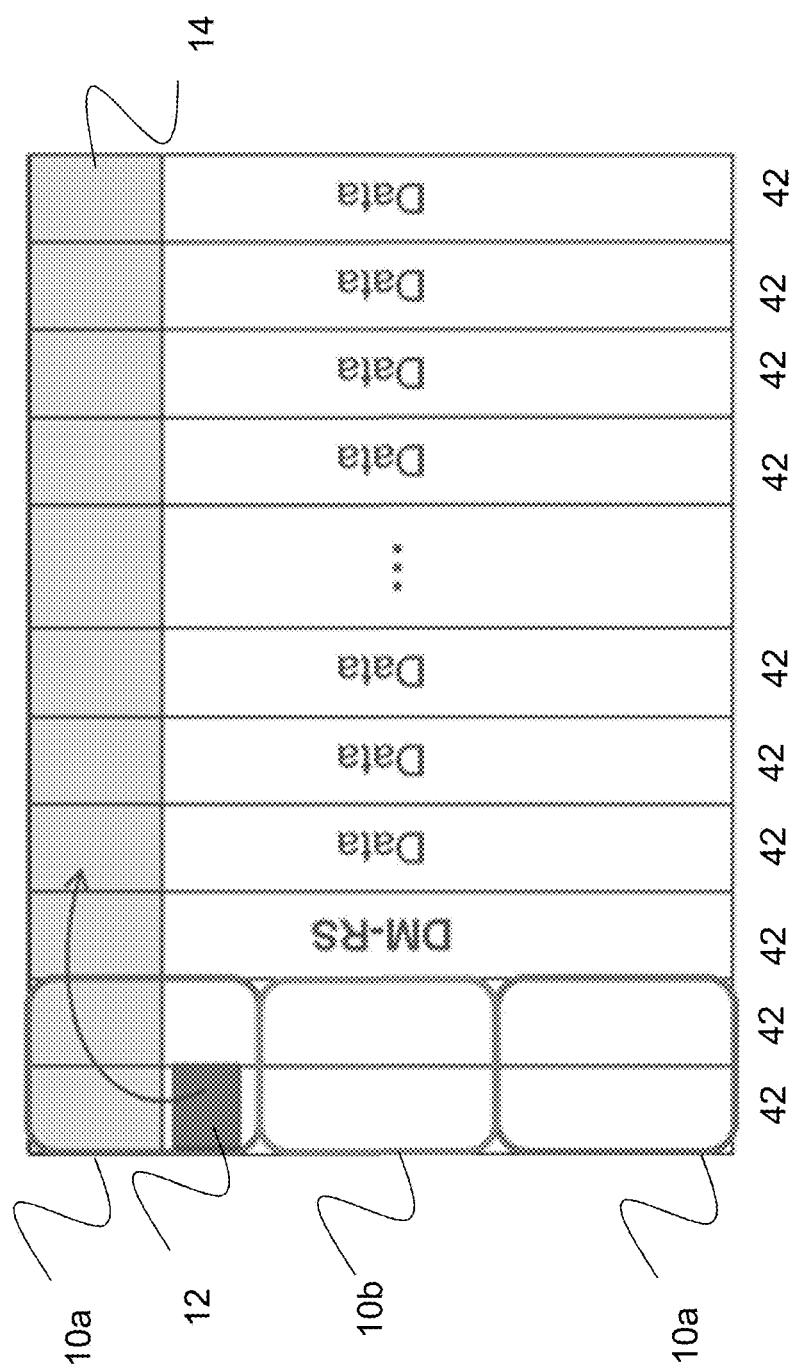
FIG. 2 illustrates an example of the reuse of resources in the control resource set (CORESET) within the time and frequency region indicated by the scheduled physical resource blocks (PRBs) and start symbol for data, according to a particular embodiment.

FIG. 2 illustrates an example of the reuse of resources in the CORESET only within the time and frequency region indicated by the scheduled PRBs and start symbol for data, according to a particular embodiment. The illustrated example includes a transmission time interval comprising a plurality of OFDM symbols 42. The transmission time interval includes control resource regions 10 (e.g., 10a and 10b), a control channel 12, and data transmission region 14.

The UE receiving control channel 12 (e.g., PDCCH 12) for scheduled data transmission region 14a is configured with two control resource regions 10a (e.g., CORESETs 10a). Control resource region 10a comprises two groups of PRBs. In the first two OFDM symbols, Control resource region 10B comprises one group of PRBs in the first two OFDM symbols. A network node, such as network node 120 described above, may use control resource regions 10 for sending control channels to a UE, such as wireless device 110 described above. For example, network node 120 may send control channel 12 to wireless device 110 to schedule a downlink transmission (e.g., PDCCH with DCI).

The scheduling information for the downlink transmission indicates to the UE which time and frequency resources will be used for the downlink transmission. The time and frequency resources are represented by data transmission region 14. In the illustrated example, data transmission region 14 starts at the first OFDM symbol and continues in each OFDM symbol of the transmission time interval. The frequency range of the resources allocated for data transmission is the same inside control resource region 10a as outside control resource region 10a. The portion of data transmission region 14 inside control resource region 10a does not overlap with control channel region 12.

Figure 3:
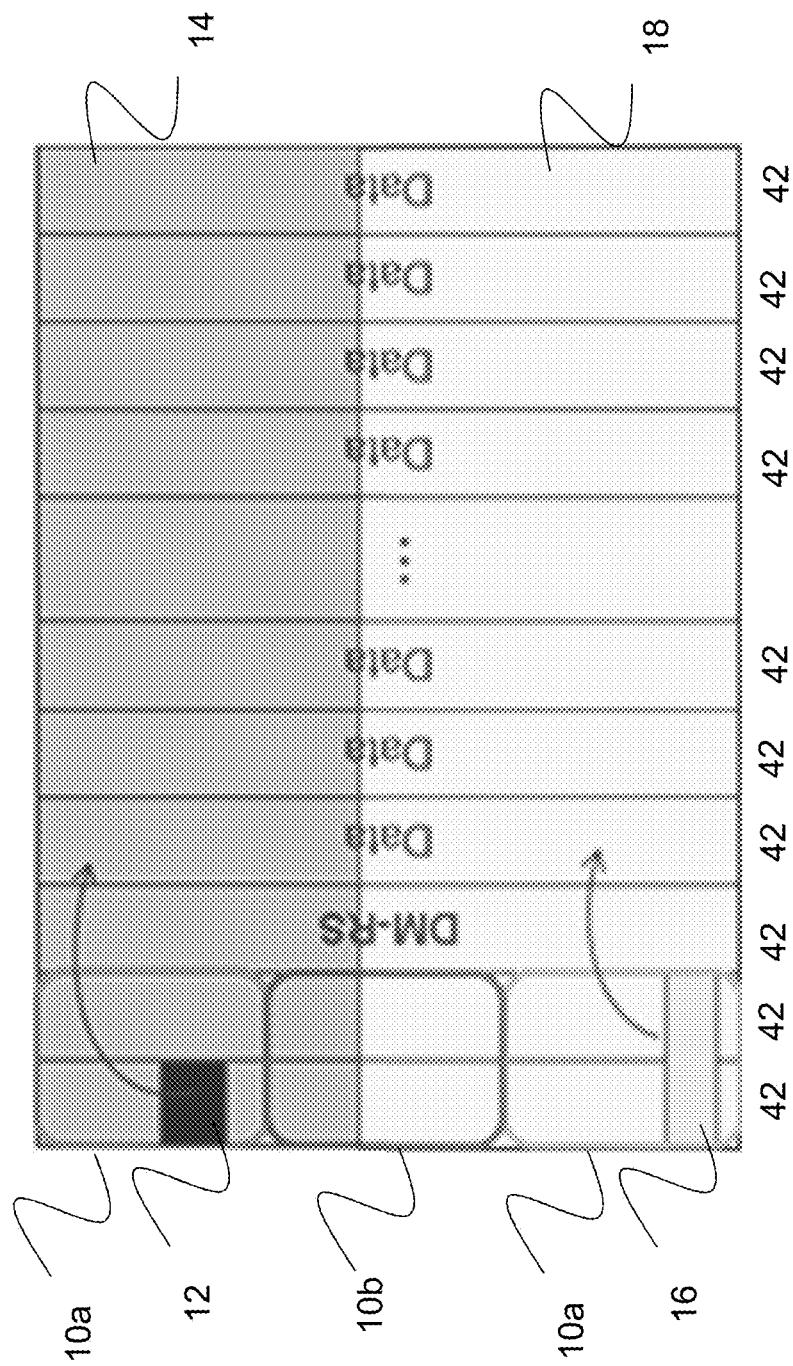
FIG. 3 illustrates another example of the reuse of resources in the CORESET only within the time and frequency region indicated by the scheduled PRBs and start symbol for data, according to a particular embodiment.

FIG. 3 illustrates another example of the reuse of resources in the CORSET only within the time and frequency region indicated by the scheduled PRBs and start symbol for data, according to a particular embodiment. The illustrated example includes a transmission time interval comprising a plurality of OFDM symbols 42, control resource regions 10, control channels 12 and 16, and data transmission regions 14 and 18.

A first UE, receiving control channel 12 (e.g., PDCCH 12) for scheduled data transmission region 14 is configured with two control resource regions 10a (e.g., CORESETs 10a) in the first two OFDM symbols. A second UE receiving control channel 16 (e.g., PDCCH 16) for scheduled data transmission region 18 is also configured with two control resource regions 10a CORESETs 10a) in the first two OFDM symbols. For example, network node 120 may send control channel 12 (e.g., PDCCH 12) that includes downlink control information to a first wireless device 110 to schedule a downlink transmission in the time and frequency resources represented by data transmission region 14. Network node 120 may send control channel 16 (e.g., PDCCH 16) that includes downlink control information to a second wireless device 110 to schedule a downlink transmission in the time and frequency resources represented by data transmission region 18.

In the illustrated example, data transmission region 14 starts at the first OFDM symbol and continues in each OFDM symbol of the transmission time interval. Data transmission region 14 also starts at the first OFDM symbol and continues in each OFDM symbol of the transmission time interval, but uses different frequency resources than data transmission region 14.

In the illustrated example, the frequency range of the resources allocated for data transmission is different inside control resource region 10a than outside control resource region 10a. The frequency range of the resources allocated for data transmission is the same inside control resource region 10b as outside control resource region 10b. The portion of data transmission region 14 inside control resource region 10a excludes control channel region 12. The portion of data transmission region 18 inside control resource region 10a excludes control channel region 16.

Figure 4:
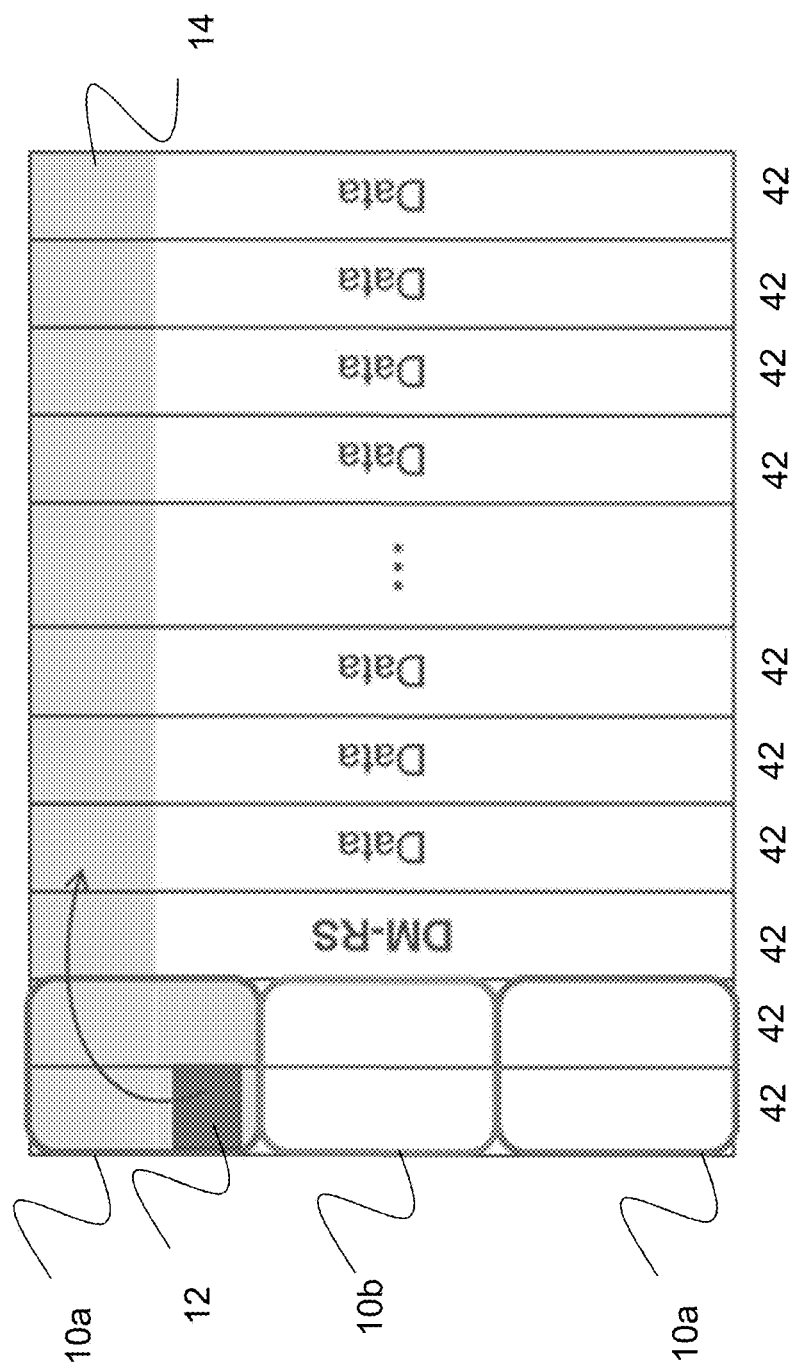
FIG. 4 illustrates an example of the reuse of resources in the CORESET only within the scheduled PRBs, according to a particular embodiment.

A fourth group of embodiments includes control region reuse independent of a frequency region indicated by scheduled PRBs. The resources in the control region are reused independent of the frequency region indicated by the scheduled PRBs. This is illustrated in FIG. 4, where a UE receives a PDCCH in a CORESET, but the UE is scheduled to receive data in PRBs only spanning a part of the CORESET bandwidth. According to this embodiment, the resources in the CORESET are fully reused including in the PRBs that fall outside of the frequency region of the scheduled PRBs for data reception.

FIG. 4 illustrates an example of the reuse of resources in the CORESET only within the scheduled PRBs, according to a particular embodiment. The illustrated example includes a transmission time interval comprising a plurality of OFDM symbols 42, control resource regions 10, control channel 12, and data transmission region 14, similar to those described with respect to FIG. 2.

A UE receiving control channel 12 (e.g., PDCCH 12) for scheduled data transmission region 14 is configured with two control resource regions 10a (e.g., CORESETs 10a) in the first two OFDM symbols. In the illustrated example, the frequency range of the resources allocated for data transmission is different inside control resource region 10a than outside control resource region 10a. For example, the frequency domain bandwidth of control resource region 10a is larger than the bandwidth used for the portion of data transmission region 14 that is outside of control resource region 10a. Within control resource 10a, data transmission region 14 uses the entire bandwidth of control resource region 10a (excluding resources used for control channel region 12).

Figure 5:
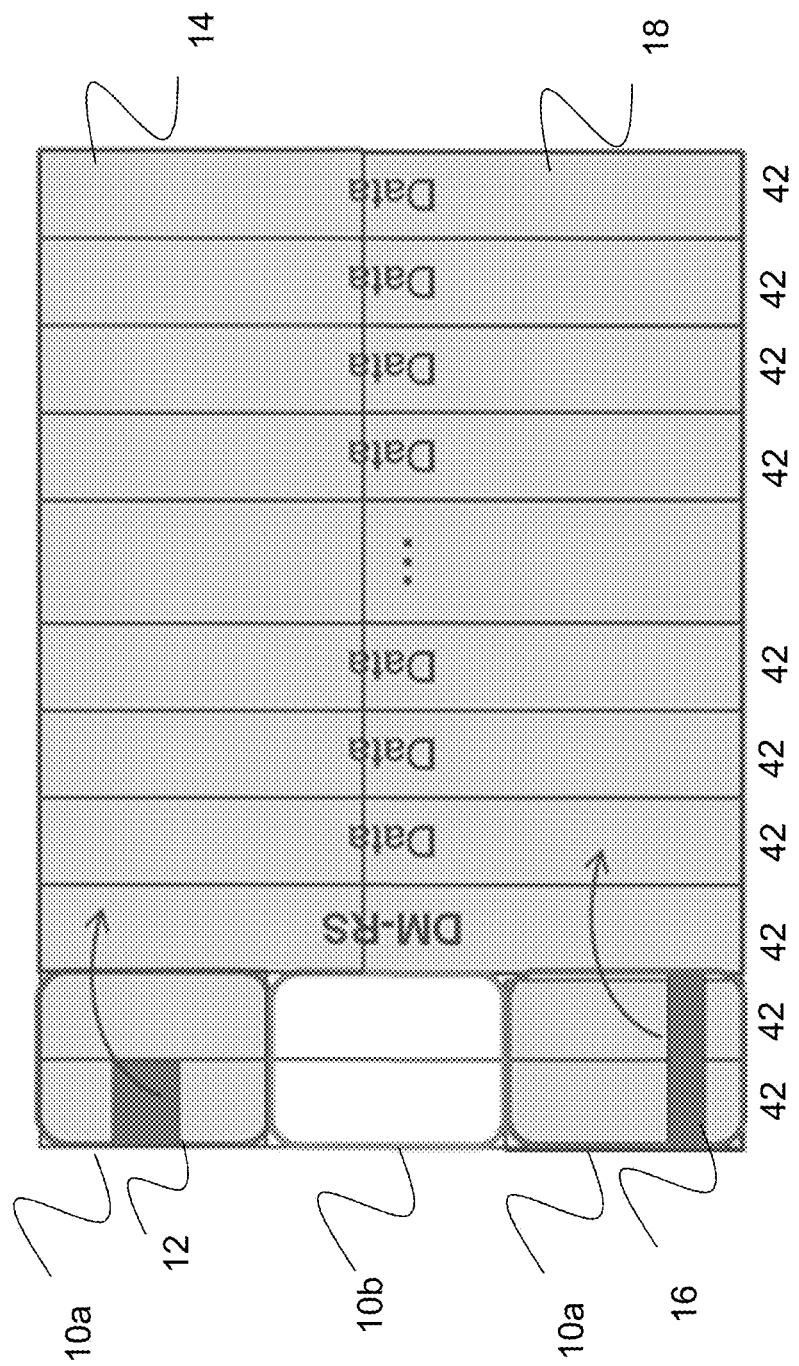
FIG. 5 illustrates an example of the reuse of resources in the CORESET only within the CORESET, according to a particular embodiment.

FIG. 5 illustrates an example of the reuse of resources in the CORESET only within the CORESET, according to a particular embodiment. The illustrated example includes a transmission time interval comprising a plurality of OFDM symbols 42, control resource regions 10, control channels 12 and 16, and data transmission regions 14 and 18, similar to those described with respect to FIG. 3.

A UE receiving control channel 12 (e.g., PDCCH 12) for scheduled data transmission region 14 is configured with two control resource regions 10a (e.g., CORESETs 10a) in the first two OFDM symbols. In the illustrated example, the frequency range of the resources allocated for data transmission is different inside control resource region 10a than outside control resource region 10a.

For example, the frequency domain bandwidth of control resource region 10a is smaller than the bandwidth used for the portion of data transmission region 14 that is outside of control resource region 10a. Similarly, the frequency domain bandwidth of control resource region 10a is smaller than the bandwidth used for the portion of data transmission region 18 that is outside of control resource region 10a. Within control resource 10a, data transmission regions 14 and 18 use the entire bandwidth of control resource region 10a (excluding resources used for control channel regions 12 and 16).

A fifth group of embodiments include puncturing data resources reused in a control region by one UE to transmit PDCCH for another UE. Two UEs may receive PDCCH messages within CORESETs that may be partially or fully overlapping. Each UE assumes that the resources used for PDCCH transmission for the other UE is part of its own data transmission. The gNB adjusts for the loss in performance due to such puncturing by adjusting the coding rate of the PDSCH transmissions to each UE. This is illustrated in FIG. 6, where the resources used for the PDCCH for one of the UEs (e.g., control channel 12) are assumed to be data REs by the other UE (whose PDCCH and data transmissions are illustrated by control channel 16 and data transmission region 18, respectively).

Figure 6:
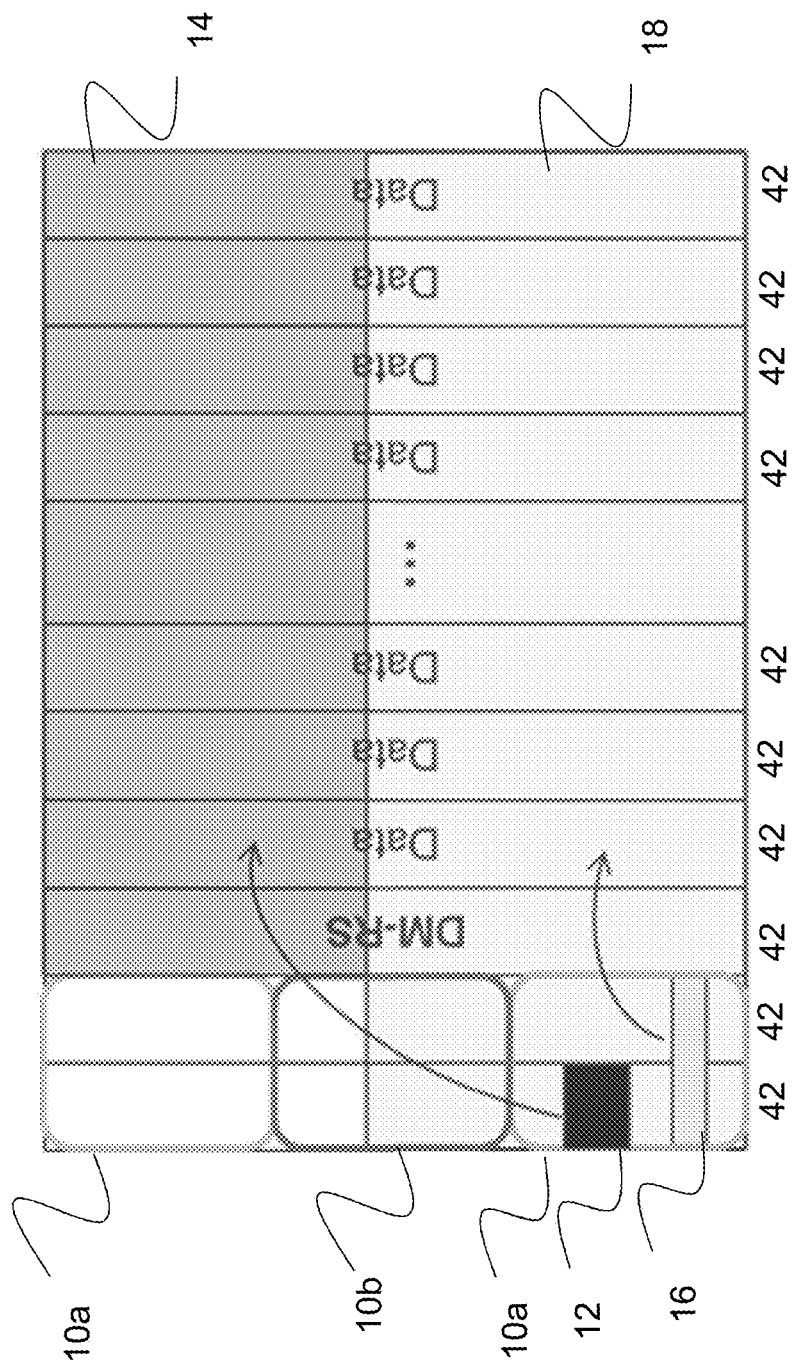
FIG. 6 illustrates an example of the puncturing of resources reused for data by one user equipment (UE) in the CORESET to transmit a physical downlink control channel (PDCCH) for another UE, according to a particular embodiment.

FIG. 6 illustrates an example of the puncturing of resources reused for data by one UE in the CORESET to transmit PDCCH for another UE, according to a particular embodiment. The illustrated example includes a transmission time interval comprising a plurality of OFDM symbols 42, control resource regions 10, control channels 12 and 16, and data transmission regions 14 and 18, similar to those described above.

Two UEs receiving control channels 12 and 16 (e.g., PDCCHs 12 and 16) for scheduled data (e.g., data transmission regions 14 and 18) are configured with two control resource regions 10a (e.g., CORESETs 10a) in the first two OFDM symbols each that are fully overlapped.

Data transmission region 14 starts at the third OFDM symbol and continues to the end of the transmission time interval. Data transmission region 14 does not include time and frequency resources within control resource regions 10. Data transmission region 18 starts at the first OFDM symbol and continues to the end of the transmission time interval. Data transmission region 18 includes time and frequency resources within control resource regions 10a and 10b. Within control resource region 10a, data transmission region 18 excludes control resource region 16, but does not exclude control resource region 12.

A sixth group of embodiments include reuse of control region resources for data without any scheduled data outside of the control region. The entire data transmission is contained within one or more of the CORESETs configured to the UE. For example, a UE may receive a PDCCH without an RB allocated for data in the region outside the CORESETs but with a field indicating reuse of control region resources for data. The UE may then receive data only in resources within the CORESET where the PDCCH was received and also possibly in the other configured CORESETs depending on what is indicated in the field in the control message transmitted by the gNB. This is illustrated in FIG. 7.

Figure 7:
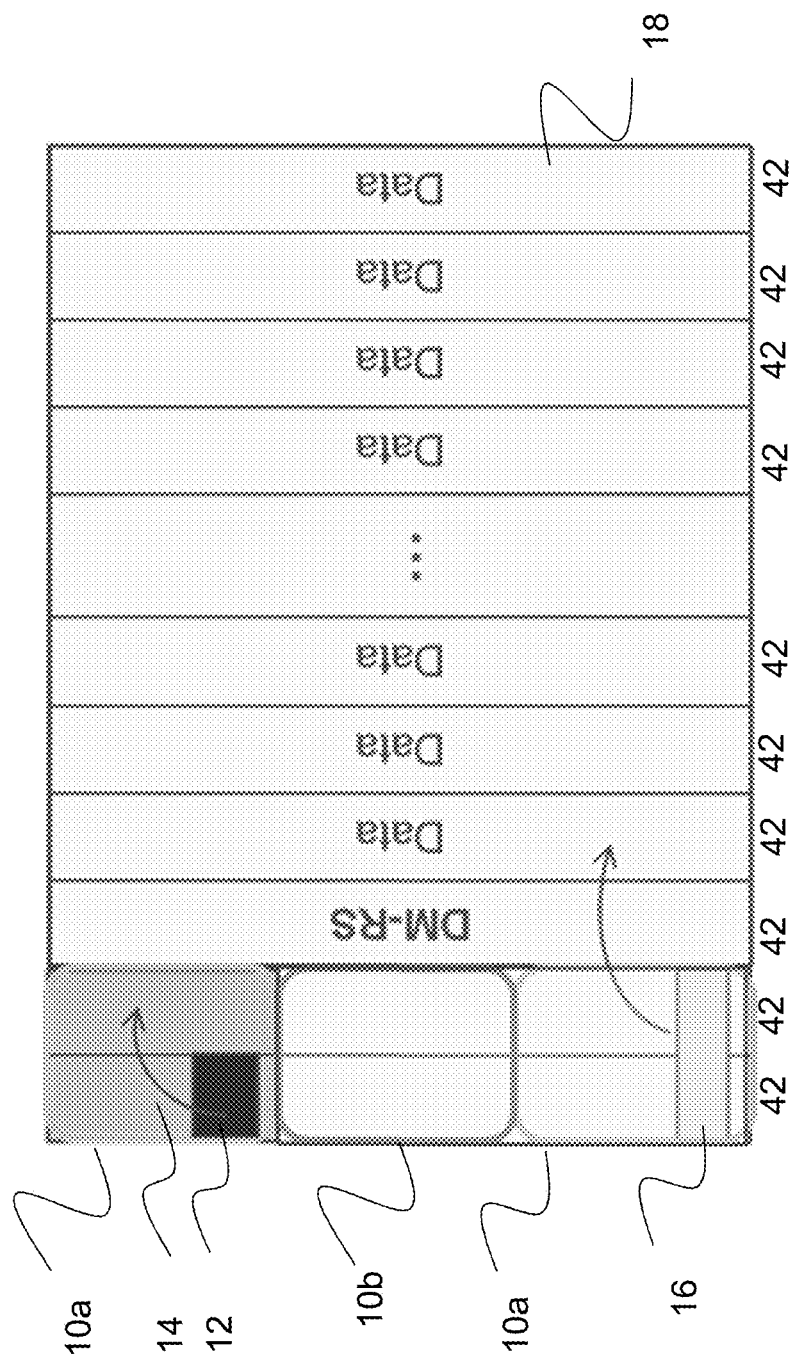
FIG. 7 illustrates an example of the reuse of resources in the CORESET for data transmission without any resource allocation for data transmission outside of the CORESET, according to a particular embodiment.

FIG. 7 illustrates an example of the reuse of resources in the CORESET for data transmission without any resource allocation for data transmission outside of the CORESET, according to a particular embodiment. The illustrated example includes a transmission time interval comprising a plurality of OFDM symbols 42, control resource regions 10, control channels 12 and 16, and data transmission regions 14 and 18, similar to those described above.

A UE with PDCCH and a scheduled data transmission is illustrated as control channel 12 and data transmission region 14, respectively. Two UEs receiving control channels 12 and 16 (e.g., PDCCHs 12 and 16) for scheduled data (e.g., data transmission regions 14 and 18) are configured with two control resource regions 10a (e.g., CORESETs 10a) in the first two OFDM symbols each that are fully overlapped.

Data transmission region 18 starts at the first OFDM symbol and continues to the end of the transmission time interval. Data transmission region 18 includes time and frequency resources within control resource regions 10*a* and 10*b* (excluding control channel region 16). Data transmission region 14 only includes time and frequency resources within control resource regions 10*a*. (excluding time and frequency resources of control resource region 12.

In a feature of this embodiment, the gNB may configure multiple CORESETs to the UE for the express purpose of such data transmissions in some of the CORESETs which may be useful to serve traffic that needs to meet very low latency requirements and that may need to be sent in a particular slot even when there are other UEs that may be scheduled in that slot either via PDCCHs received in the same slot or from previous slots.

In another feature of this embodiment, modulation and coding scheme (MCS) to transport block size (TBS) mappings may be defined specifically for data transmissions that occur only in CORESETs as shown in the above figure. Hybrid ARQ can be used fix these transmissions with the HARQ IDs to be used for such data transmissions being sent in the DCI message.

In a further feature of the embodiment, additional self-contained DMRS is included in the CORESET for the data transmission within the CORESET only. One nonlimiting embodiment is to insert DMRS patterns and locations consistent with those for the PDCCH.

A seventh group of embodiments include reuse of control region resources for data without any scheduled data outside of the control region in the same symbol as PDCCH. The entire data transmission may be contained within one or more of the CORESETs configured to the UE. For example, a UE may receive a PDCCH without any REs allocated for data in the region outside the CORESETs but with a field indicating reuse of control region resources for data in the same symbol as the one which PDCCH was found. An example is illustrated in FIG. 8.

Figure 8:
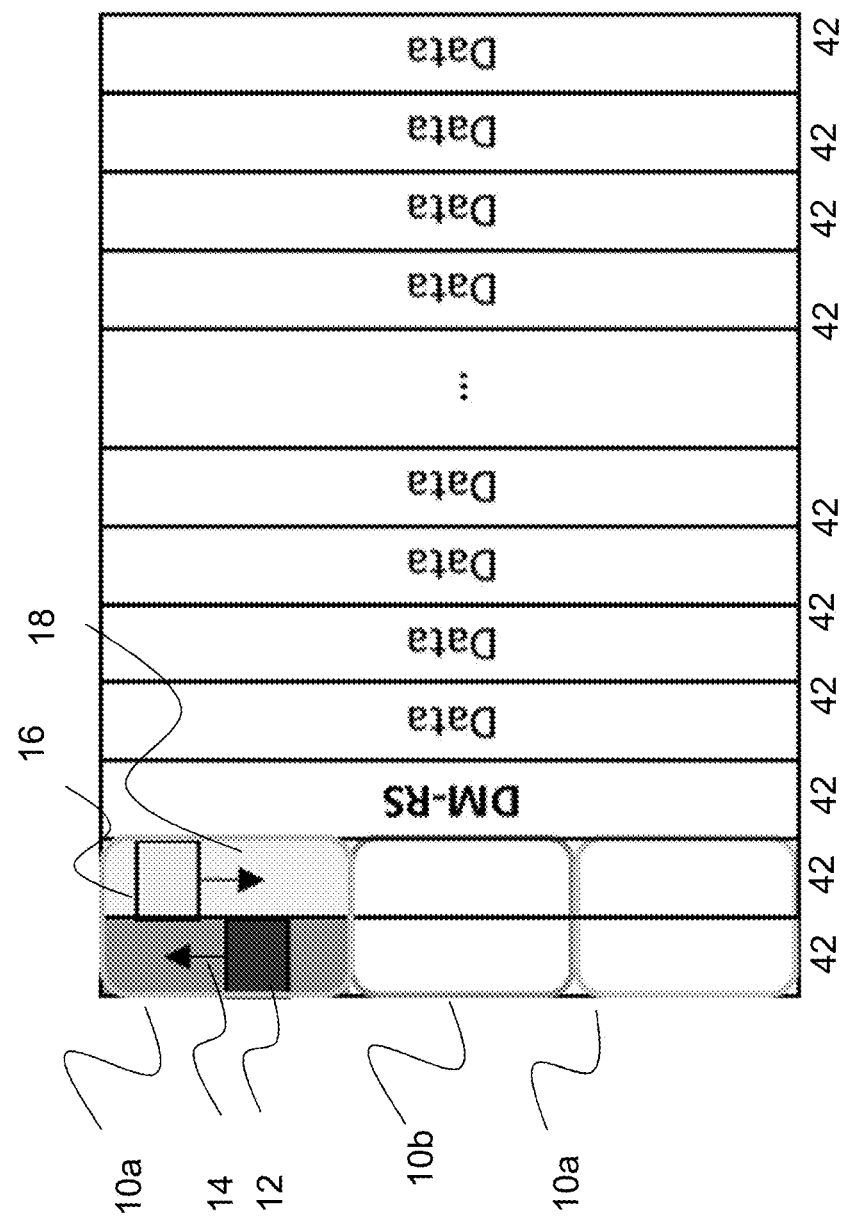
FIG. 8 illustrates an example of the reuse of resources in the CORESET for data transmission without any resource allocation for data transmission outside of the CORESET in the symbol for which PDCCH was received in, according to a particular embodiment.

FIG. 8 illustrates an example of the reuse of resources in the CORESET for data transmission without any resource allocation for data transmission outside of the CORESET in the symbol for which PDCCH was received in, according to a particular embodiment. The illustrated example includes a transmission time interval comprising a plurality of OFDM symbols 42, control resource regions 10, control channels 12 and 16, and data transmission regions 14 and 18, similar to those described above.

A first UE with PDCCH and a scheduled data transmission is illustrated as control channel 12 and data transmission region 14, respectively. A second UE with PDCCH and a scheduled data transmission is illustrated as control channel 16 and data transmission region 18, respectively.

Two UEs receiving PDCCHs (e.g., control channels 12 and 16) for scheduled data (e.g., data transmission regions 14 and 18) are configured with two control resource regions 10*a* CORESETs 10*a*) in the first two OFDM symbols each that are fully overlapped.

Data transmission region 14 consists of the first OFDM symbol and includes the bandwidth of control resource region 10*a* (excluding the time and frequency resources of control resource region 12). Data transmission region 18 consists of the second OFDM symbol and includes the bandwidth of control resource region 10*a* (excluding the time and frequency resources of control resource region 16).

An eighth group of embodiments include mint encoding of starting time and control region reuse options. The frequency region may be split into a number of (possibly non-equally sized) regions. For each region, signaling informs the UE whether REs in that frequency region during the OFDM symbols spanned by a CORESET should be excluded from a resource allocation or not. It has some similarity with the first group of embodiments, but instead of excluding a CORESET, regions indicated by the gNB are excluded. One benefit is that the gNB can signal to the UE to exclude also resources the gNB knows overlaps with other users' CORESETs.

For example, the frequency region can be split into four quarters, each ¼ of the total bandwidth. A bitmap can be used to indicate whether a particular quarter is to be excluded from a resource allocation or not.

A ninth group of embodiments include joint encoding of starting time and control region reuse options. A single field may be used to indicate the OFDM symbol at which data starts and how the control regions configured to the UE should be reused for data transmission. An example of the encoding for the values of such a single field is described below where three bits are used. In the following, CORESET refers to the control region where the PDCCH message is received.

000: Start symbol is after the CORESET for all the scheduled PRBs AND all REs outside of PDCCH in scheduled CORESET in the scheduled PRBs are used for data 001: Start symbol is 0 for all the scheduled PRBs AND all REs outside of PDCCH scheduled CORESET in the scheduled PRBs are used for data 010: Start symbol is 1 for all the scheduled PRBs AND all REs outside of PDCCH in scheduled CORESET are used for data 011: Start symbol is after the CORESET for all the scheduled PRBs AND all REs outside of PDCCH in all CORESETS configured to the UE are used for data 100: Start symbol is after the CORESET for all the scheduled PRBs AND all REs outside of PDCCH in scheduled CORESET excluding the first symbol of the CORESET are used for data 101: Start symbol is after the CORESET for all the scheduled PRBs AND no REs ire any configured CORESET are used for data 110: Data is transmitted only in the scheduled CORESET and REs outside of PDCCH are used for data 111: Start symbol is after the CORESET for all the scheduled PRBs AND all REs outside of PDCCH in scheduled CORESET are used for data A tenth group of embodiments include explicit use of bit maps to indicate reuse of resources in the OFDM symbols spanning the control region. Specific groups of resources in the OFDM symbols spanning the control region where the configured CORESETs reside may be assigned separate bits to indicate whether these resources are part of the data allocation or not. The regions that may be assigned bits include the following:

1) REs in the CORESET that are in OFDM symbols other than the ones where the PDCCH scheduling data was received;
2) REs in the CORESET that are in the OFDM symbols where the PDCCH scheduling data was received;
3) REs in the scheduled PRBs but outside of the CORESET in a particular OFDM symbol.

Figure 9:
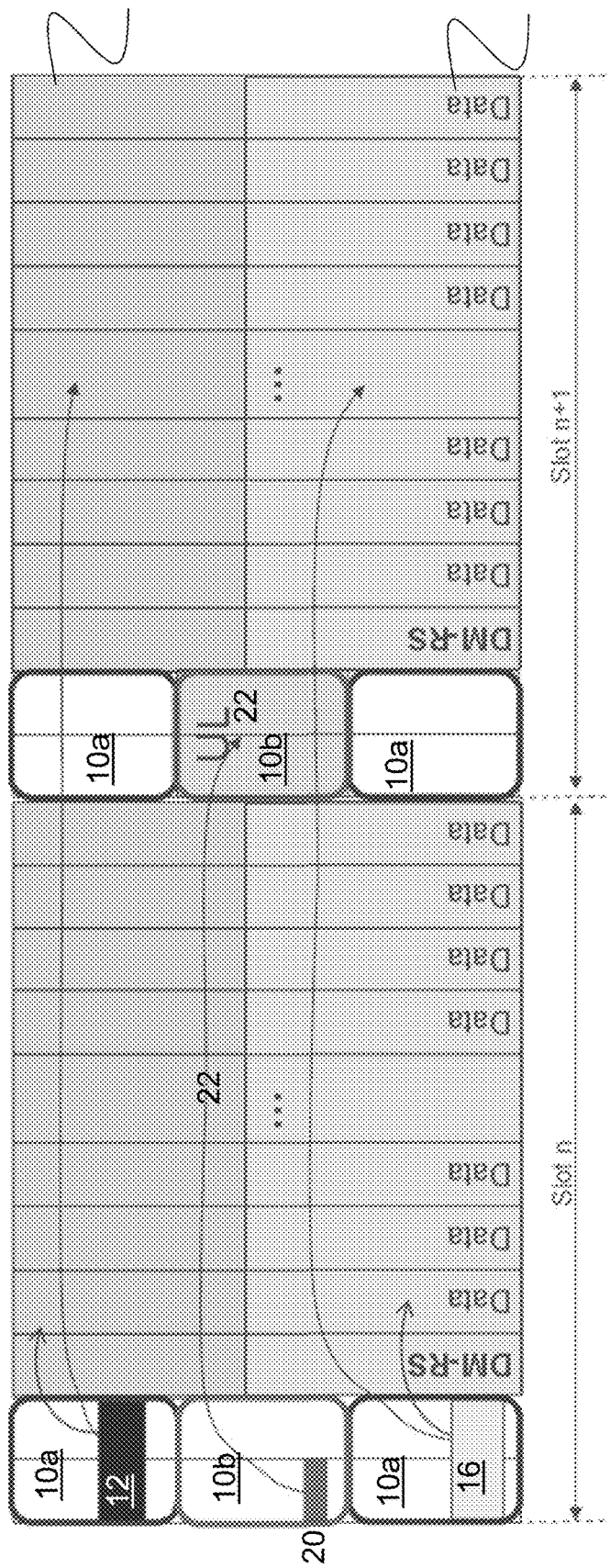
FIG. 9 illustrates an example of the reuse of resources in the CORESET for uplink data without any resource allocation of data transmissions outside of the CORESET, according to a particular embodiment.

An eleventh group of embodiments include use of control resource set for uplink transmission. The entire data transmission may be contained within one or more CORESETs configured to the UP for uplink transmission. In another example, the entire data transmission is contained outside one or more or all CORESETs configured to the UE for uplink transmission. For example, as illustrated in FIG. 9, in a previous slot the DCI message can schedule downlink transmission in the next slot starting from a symbol different from the first symbol in that slot. Also, an uplink grant in the previous slot can indicate uplink transmission in the next slot prior to the downlink transmission.

FIG. 9 illustrates an example of the reuse of resources in the CORESET for uplink data without any resource allocation of data transmissions outside of the CORESET, according to a particular embodiment. The illustrated example includes a transmission time interval comprising a plurality of OFDM symbols, control resource regions 10, control channels 12, 16 and 20, and data transmission regions 14, 18 and 22.

A network node, such as network node 120, may use control resource regions 10 for sending control channels to a UP, such as wireless device 110. For example, network node 120 may send control channel 12 to wireless device 110 to schedule an uplink transmission (e.g., PDCCH with DCI).

As one example, a UE receiving control channel 20 in control resource region 10b reuses resources in the next control resource region 10b (e.g., CORESET 10b) (indicated by arrow 22) for uplink data (e.g., data transmission region 22) without any resources allocated for data transmissions outside of control resource region 10b (e.g., CORESET 10b). The UEs in slot receive the scheduling information in the previous slot n. For example, control channel regions 12 and 16 include scheduling for slot n and slot (as illustrated by the arrows in FIG. 9).

The above embodiments may be combined as well. For example, group of embodiments 7 and 8 may be used as methods to enable the techniques in the earlier embodiments.

The embodiments above may include multiple PDDCHs transmission for a UE as well as other transmissions such as broadcast channels and synchronization signal monitored by a UE in a control resource sets. All resources known to the UE that are used for something other than user data transmissions are considered as used resources in a control resource set.

Figure 10:
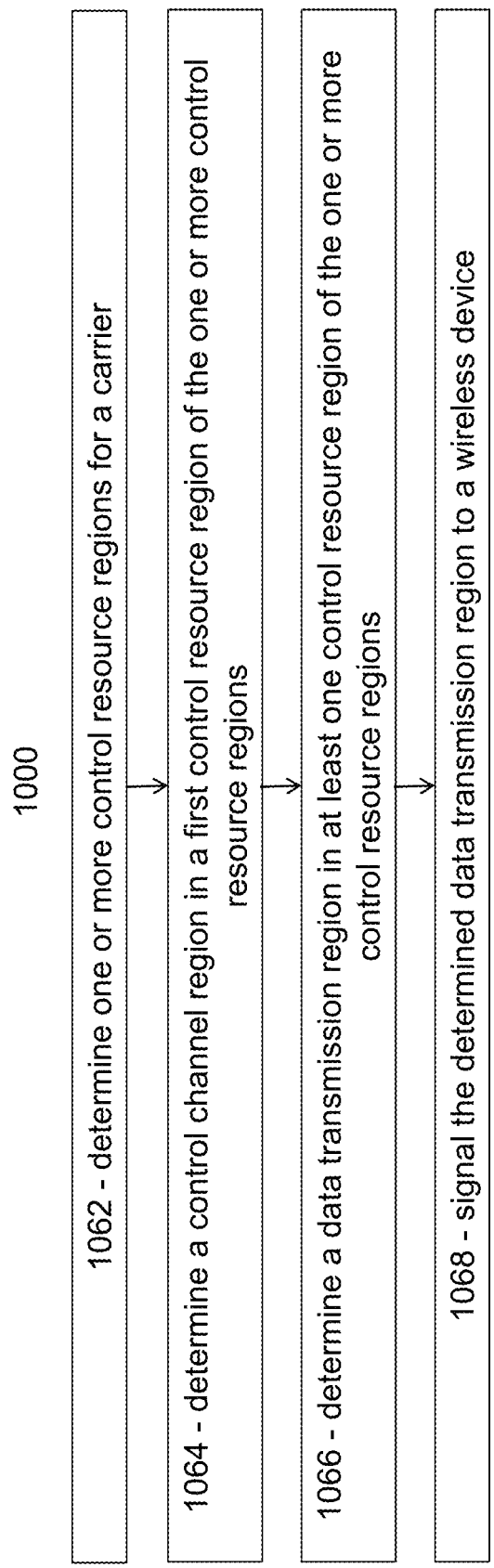
FIG. 10 is a flow diagram illustrating an example method in a network node, according to some embodiments.

FIG. 10 is a flow diagram illustrating an example method in a network node, according to some embodiments. In particular embodiments, one or more steps of FIG. 10 may be performed by network node 120 of wireless network 100 described with respect to FIG. 1.

The method begins at step 1062, where the network node determines one or more control resource regions for a carrier. For example, network node 120 may determine one or more CORESETs (or any other suitable control resource) (e.g., control resource regions 10 illustrated with respect to FIGS. 2-9) on which it may transmit control information to one or more wireless devices 110. Network node 120 may determine control resource region 10 dynamically (e.g., such as receiving signaling or other communications from another component of network 100), or network node 120 may be provisioned or pre-configured with information about one or more control resource regions.

At step 1064, the network node determines a control channel region in a first control resource region of the one or more control resource regions. For example, network node 120 may determine a PDCCH (e.g., control channels 12, 16 or 18 illustrated with respect to FIGS. 2-9) in the control resource region for transmitting control information to wireless device 110.

The control channel may comprise a subset of the time and frequency resources that comprise the control resource region. The remaining time and frequency resources may be used for another control channel, used for data transmission, or unused.

Network node 120 may determine the control channel region dynamically (e.g., such as receiving signaling or other communications from another component of network 100), or network node 120 may be provisioned or pre-configured with information about one or more control channel regions.

At step 1066, the network node determines a data transmission region in at least one control resource region of the one or more control resource regions. For example, network node 120 may determine that control resource region 10 includes unused resources (i.e., resources not used for a control channel or for data transmission). Network node 120 may determine that some or all of these resources may be used for data transmission. In some embodiments, network node 120 may determine that some used resources (e.g., a control channel for a lower priority user or service may be punctured for higher priority data transmission).

In particular embodiments, the data transmission region comprises a subset of the resources in the at least one control resource region. An example is illustrated in FIG. 2 where data transmission region 14 includes a subset of resources in control resource region 10a. The data transmission region may exclude resources for the control channel region. For example, with respect to FIG. 2, data transmission region 14 excludes control channel region 12. As another example, with respect to FIG. 3, data transmission region 14 includes all the resources of control region 10a except for the resources used by control channel region 12.

In particular embodiments, the data transmission region comprises resources within the at least one control resource region and resources outside of any of the one or more control resource regions. For example, FIGS. 2-6 all illustrates data transmission regions 14 and/or 18 that includes resources both within and outside of control resource region 10.

A frequency range of resources within the at least one control resource region may be the same as a frequency range of the resources outside of any of the one or more control resource regions (e.g., data transmission region 14 of FIG. 2), or the frequency range may be different than the frequency range of the resources outside of any of the one or more control resource regions (e.g., data transmission region 14 of FIG. 3).

In particular embodiments, the data transmission region excludes resources outside of the at least one control resource region (e.g., data transmission region 14 of FIG. 7 is included entirely within control resource region 10a). The data transmission region may comprise all resources in the at least one control resource region (e.g., data transmission region 18 of FIG. 7 includes all the resources of control resource region 10b). The network node may determine the data transmission region according to any of the embodiments or examples described herein (e.g., with respect to FIGS. 2-9).

At step 1068, the network node signals the determined data transmission region to a wireless device. For example, network node 120 may signal the determined data transmission region to wireless device 110.

In some embodiments, the signaling may include a starting symbol and a number of symbols for data transmission.

The signaling may include a frequency range. The signaling may include resource regions excluded from the data transmission region.

In some embodiments, the wireless device may determine the excluded regions implicitly based on predetermined rules or known control regions. In some embodiments, the network node may explicitly signal excluded resource regions.

In particular embodiments, signaling the determined data transmission region to the wireless device comprises signaling a bitmap. The bitmap may indicate one or more groups of time and frequency resources used for the data transmission region, and/or one or more groups of time and frequency resources excluded from the data transmission region.

In particular embodiments, signaling the determined data transmission region to the wireless device comprises signaling an identifier of at least one control resource region. The identifier of the at least one control resource region indicates a control resource region used for the data transmission region, and/or a control resource region excluded from the data transmission region. The network node may signal the data transmission region according to any of the embodiments or examples described herein (e.g., with respect to FIGS. 2-9).

Modifications, additions, or omissions may be made to method 1000. Additionally, one or more steps in method 100 of FIG. 1 may be performed in parallel or in any suitable order. The steps of method 1000 may be repeated over time as necessary.

Figure 11:
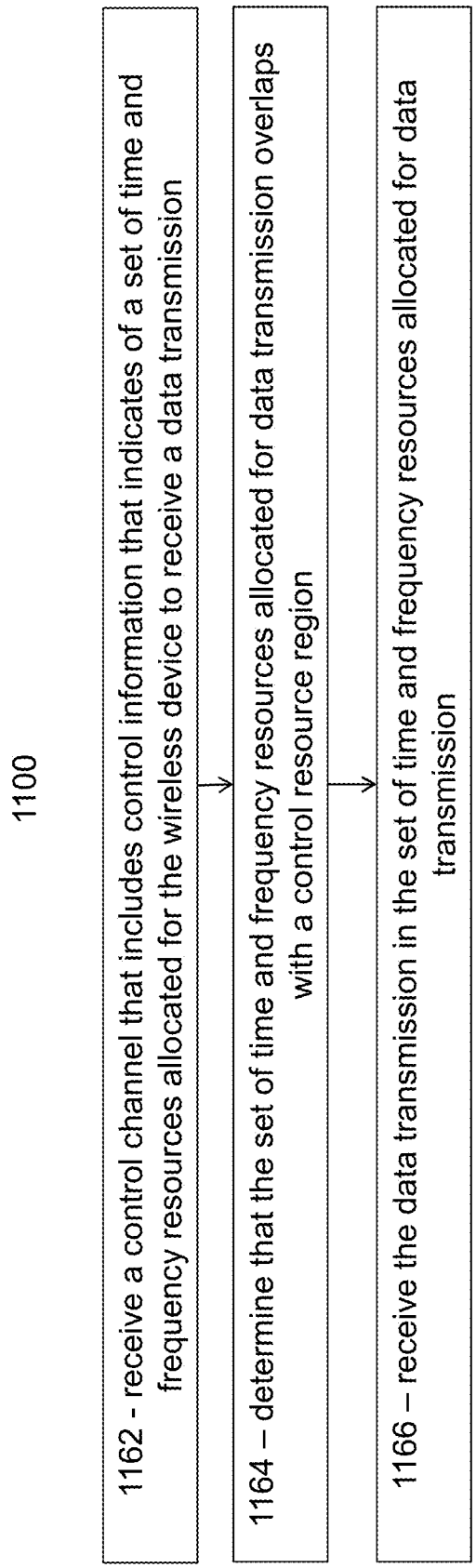
FIG. 11 is a flow diagram illustrating an example method in a wireless device, according to some embodiments.

FIG. 11 is a flow diagram illustrating an example method in a wireless device, according to some embodiments. In particular embodiments, one or more steps of FIG. 11 may be performed by wireless device 110 of wireless network 100 described with respect to FIG. 1.

The method begins at step 1162, where the wireless device receives a control channel that includes control information that indicates a set of time and frequency resources allocated for the wireless device to receive a data transmission. For example, wireless device 110 may receive a control channel (e.g., PDCCH) from network node 120).

At step 1164, the wireless device determines that the set of time and frequency resources allocated for data transmission overlaps with a control resource region. For example, wireless device 110 may determine that a data transmission region includes resources of one or more control resource regions 10.

In particular embodiments, the data transmission region comprises a subset of the resources in the at least one control resource region. An example is illustrated in FIG. 2 where data transmission region 14 includes a subset of resources in control resource region 10a. The data transmission region may exclude resources for the control channel region. For example, with respect to FIG. 2, data transmission region 14 excludes control channel region 12. As another example, with respect to FIG. 3, data transmission region 14 includes all the resources of control region 10a except for the resources used by control channel region 12.

In particular embodiments, the data transmission region comprises resources within the at least one control resource region and resources outside of any of the one or more control resource regions. For example, FIGS. 2-6 all illustrates data transmission regions 14 and/or 18 that includes resources both within and outside of control resource region 10.

A frequency range of resources within the at least one control resource region may be the same as a frequency range of the resources outside of any of the one or more control resource regions (e.g., data transmission region 14 of FIG. 2), or the frequency range may be different than the frequency range of the resources outside of any of the one or more control resource regions (e.g., data transmission region 14 of FIG. 3).

In particular embodiments, the data transmission region excludes resources outside of the at least one control resource region (e.g., data transmission region 14 of FIG. 7 is included entirely within control resource region 10a). The data transmission region may comprise all resources in the at least one control resource region (e.g., data transmission region 18 of FIG. 7 includes all the resources of control resource region 10b). The network node may determine the data transmission region according to any of the embodiments or examples described herein (e.g., with respect to FIGS. 2-9).

In some embodiments, the wireless device may determine that particular regions of the data transmission are excluded implicitly based on predetermined rules or known control regions. In some embodiments, network node 120 may explicitly signal excluded resource regions to wireless device 110.

For example, in particular embodiments, network node 120 may signal the determined data transmission region to wireless device 110 with a bitmap. The bitmap may indicate one or more groups of time and frequency resources used for the data transmission region, and/or one or more groups of time and frequency resources excluded from the data transmission region.

In another example, network node 120 may signal the determined data transmission region to wireless device 110 with an identifier of at least one control resource region. The identifier of the at least one control resource region indicates a control resource region used for the data transmission region, and/or a control resource region excluded from the data transmission region. The network node may signal the data transmission region according to any of the embodiments or examples described herein (e.g., with respect to FIGS. 2-9).

At step 1166, the wireless device receives/transmits the data transmission in the set of time and frequency resources allocated for data transmission. For example, wireless device 110 may receive a data transmission from network node 120 in the set of time and frequency resources allocated for data transmission. Wireless device 110 may know to ignore particular regions excluded from the data transmission region.

Modifications, additions, or omissions may be made to method 1100. Additionally, one or more steps in method 1100 of FIG. 11 may be performed. In parallel or in any suitable order. The steps of method 1100 may be repeated over time as necessary.

Figure 12B:
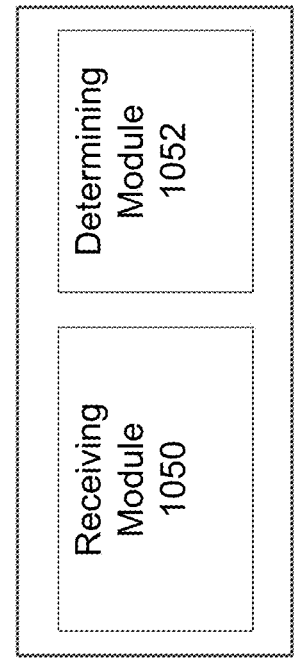
FIG. 12B is a block diagram illustrating example components of a wireless device.
Figure 12A:
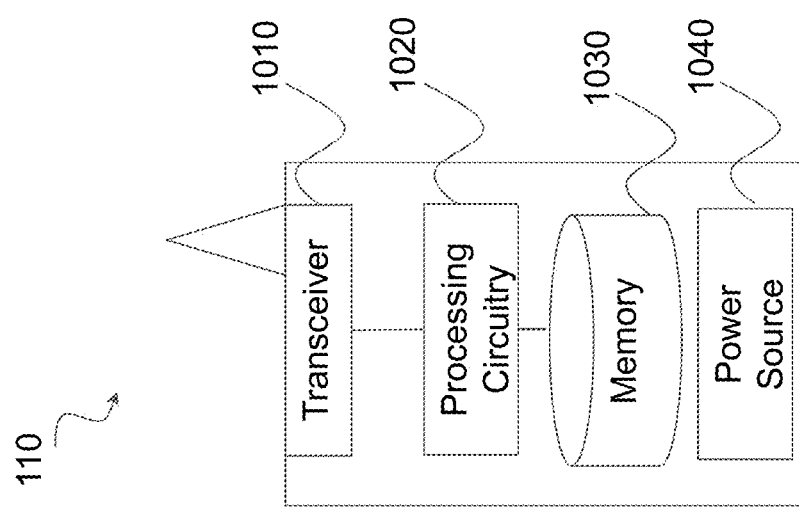
FIG. 12A is a block diagram illustrating an example embodiment of a wireless device.

FIG. 12A is a block diagram illustrating an example embodiment of a wireless device. The wireless device is an example of the wireless devices 110 illustrated in FIG. 1. In particular embodiments, the wireless device is capable of transmitting/receiving user data within a control resource region (e.g., CORESET).

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1010, processing circuitry 1020, memory 1030, and power source 1040. In some embodiments, transceiver 1010 facilitates transmitting wireless signals to and receiving wireless signals from wireless network node 120 (e.g., via an antenna), processing, circuitry 1020 executes instructions to provide some or all of the functionality described herein as provided by the wireless device, and memory 1030 stores the instructions executed by processing circuitry 1020. Power source. 1040 supplies electrical power to one or more of the components of wireless device 110, such as transceiver 1010, processing circuitry 1020, and/or memory 1030.

Processing circuitry 1020 includes any suitable combination of hardware and software implemented in one or more integrated circuits or modules to execute instructions and manipulate data to perform some or all of the described functions of the wireless device. In some embodiments, processing circuitry 1020 may include, for example, one or more computers, one more programmable logic devices, one or more central processing units (CPUs), one or more microprocessors, one or more applications, and/or other logic, and/or any suitable combination of the preceding. Processing circuitry 1020 may include analog and/or digital circuitry configured to perform some or all of the described functions of wireless device 110. For example, processing circuitry 1020 may include resistors, capacitors, inductors, transistors, diodes, and/or any other suitable circuit components. Processing circuitry 1020 may perform any of the steps of the method claims below.

Memory 1030 is generally operable to store computer executable code and data. Examples of memory 1030 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1040 is generally operable to supply electrical power to the components of wireless device 110. Power source 1040 may include any suitable type of battery, such as lithium-ion, lithium-air, lithium polymer, nickel cadmium, nickel metal hydride, or any other suitable type of battery for supplying power to a wireless device. In particular embodiments, processing circuitry 1020 in communication with transceiver 1010 receives user data within a control resource region (e.g., CORESET).

Other embodiments of the wireless device may include additional components (beyond those shown in FIG. 12A) responsible for providing certain aspects of the wireless device's functionality, including any of the functionality described above and/or any additional functionality (including any functionality necessary to support the solution described above).

FIG. 12B is a block diagram illustrating example components of a wireless device 110. The components may include receiving module 1050 and determining module 1052.

Receiving module 1050 may perform the receiving functions of wireless device 110. For example, receiving module 1050 may receive a control channel that includes control information that indicates of a set of time and frequency resources allocated for wireless device 110 to receive a data transmission. Receiving module 1050 may receive the control channel and control information according to any of the examples and embodiments described above (e.g., step 1162 of FIG. 11). Receiving module 1050 may receive a data transmission in the set of time and frequency resources (e.g., step 1166 of FIG. 11). In certain embodiments, receiving module 1050 may include or be included in processing circuitry 1020. In particular embodiments, receiving module 1050 may communicate with determining module 1052.

Determining module 1052 may perform the determining functions of wireless device 110. For example, determining module 1052 may determine that the set of time and frequency resources allocated for data transmission overlaps with a control resource region, according to any of the examples and embodiments described above (e.g., step 1164 of FIG. 11). In certain embodiments, determining module 1052 may include or be included in processing circuitry 1020. In particular embodiments, determining module 1052 may communicate with receiving module 1050.

Figure 13B:
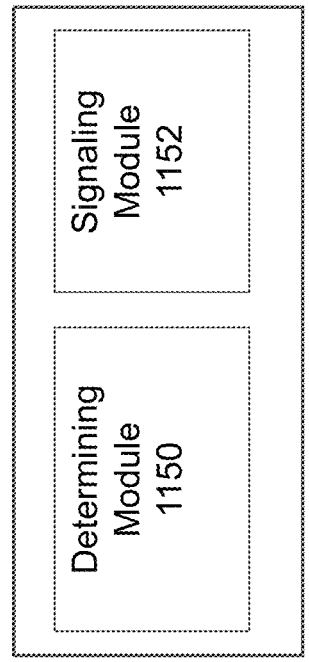
FIG. 13B is a block diagram illustrating example components of a network node.
Figure 13A:
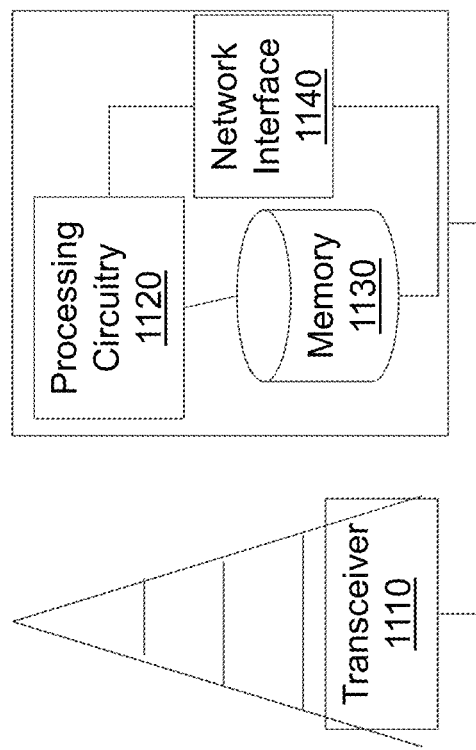
FIG. 13A is a block diagram illustrating an example embodiment of a network node.

FIG. 13A is a block diagram illustrating an example embodiment of a network node. The network node is an example of the network node 120 illustrated in FIG. 1. In particular embodiments, the network node is capable of transmitting user data within a control resource region (e.g., CORESET).

Network node 120 can be an eNodeB, a nodeB, a base station, a wireless access point (e.g., a Wi-Fi access point), a low power node, a base transceiver station (BTS), transmission point or node, a remote RF unit (RRU), a remote radio head (ARID, or other radio access node. The network node includes at least one transceiver 1110, processing circuitry 1120, at least one memory 1130, and at least one network interface 1140. Transceiver 1110 facilitates transmitting wireless signals to and receiving wireless signals from a wireless device, such as wireless devices 110 (e.g., via an antenna); processing circuitry 1120 executes instructions to provide some or all of the functionality described above as being provided by a network node 120; memory 1130 stores the instructions executed by processing circuitry 1120; and network interface 1140 communicates signals to backend network components, such as a gateway, switch, router, Internet, Public Switched Telephone Network (PSTN), controller, and/or other network nodes 120. Processing circuitry 1120 and memory 1130 can be of the same types as described with respect to processing circuitry 1020 and memory 1030 of FIG. 12A above. Processing circuitry 1120 may perform any of the steps of the method claims below.

In some embodiments, network interface 1140 is communicatively coupled to processing circuitry 1120 and refers to any suitable device operable to receive input for network node 120, send output from network node 120, perform suitable processing of the input or output or both, communicate to other devices, or any combination of the preceding. Network interface 1140 includes appropriate hardware (e.g., port, modem, network interface card, etc.) and software, including protocol conversion and data processing capabilities, to communicate through a network. In particular embodiments, processing circuitry 1120 in communication with transceiver 1110 communicates user data within a control resource region (e.g., CORESET).

Other embodiments of network node 120 include additional components (beyond those shown in FIG. 13A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 13B is a block diagram illustrating example components of a network node 120. The components may include determining module 1150 and signaling module 1152.

Determining module 1150 may perform the determining functions of network node 120. For example, determining module 1150 may determine one or more control resource regions for a carrier, determine a control channel region in a first control resource region of the one or more control resource regions, and determine a data transmission region in at least one control resource region of the one or more control resource regions. Determining module 1150 may perform the determining functions according to any of the examples and embodiments described above (e.g., step 1062-1066 of FIG. 1). In certain embodiments, determining module 1150 may include or be included in processing circuitry 1120. In particular embodiments, determining module 1150 may communicate with signaling module 1152.

Signaling module 1152 may perform the signaling functions of network node 120. For example, signaling module 1152 may signal the determined data transmission region to a wireless device, according to any of the embodiments and examples described herein (e.g., step 1068 of FIG. 10). In certain embodiments, signaling module 1152 may include or be included in processing circuitry 1120. In particular embodiments, signaling module 1152 may communicate with determining module 1150.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations Used in the Preceding Description Include:

3GPP Third Generation Partnership Project
ACK Acknowledgement
BLER Block Error Rate
BTS Base Transceiver Station
CRC Cyclic Redundancy Check
CSI Channel State Information
D2D Device to Device
DCI Downlink Control Information
DL Downlink
DMRS Demodulation Reference Signal
ePDCCH enhanced Physical Downlink Control Channel
eNB eNodeB
FDD Frequency Division Duplex
HARQ Hybrid Automatic Repeat Request
LTE Long Term Evolution
M2M Machine to Machine
MAC Medium Access Control
MCS Modulation and Coding Scheme
MIMO Multi-Input Multi-Output
MTC Machine Type Communication
NAK Negative Acknowledgement
NR New Radio
OFDM Orthogonal Frequency Division Multiplex
PDCCH Physical Downlink Control Channel
PDSCH Physical Downlink Shared Channel
PMI Preceding Matrix Indicator
PRB Physical Resource Block
PUCCH Physical Uplink Control Channel
PUSCH Physical Uplink Shared Channel
RAN Radio Access Network
RAT Radio Access Technology
RB Resource Block
RBS Radio Base Station
RE Resource Element
RI Rank Index
RNC Radio Network Controller
RRC Radio Resource Control
RRH Remote Radio Head
RRU Remote Radio Unit
RS Reference Signal
SC-FDMA Single Carrier-Frequency Division Multiple Access
TDD Time Division Duplex
TTI Transmission Time Interval
UCI Uplink Control Information
UE User Equipment
UL Uplink
UTRAN Universal Terrestrial Radio Access Network
WAN Wireless Access Network

The invention claimed is:

1. A method in a wireless device, the method comprising: receiving a signal from a network node indicating a set of time and frequency resources allocated for a data transmission, wherein a first subset of the indicated set of time and frequency resources allocated for the data transmission overlap with time and frequency resources in one or more control regions, the signal further indicating a second subset of time and frequency resources from the one or more control resource regions excluded for the data transmission; and receiving data based on the received signal.

2. The method of claim 1, wherein the signal is a physical downlink control channel (PDCCH).

3. The method of claim 1, wherein the signal comprises a bitmap for indicating the second subset of time and frequency resources from the one or more control resource regions excluded from the data transmission.

4. The method of claim 1, wherein the signal comprises an identifier of at least one control resource region excluded from the data transmission.

5. The method of claim 1, wherein the one or more control resource regions correspond to one or more Control Resource Sets (CORESETs).

6. The method of claim 1, wherein the second subset of time and frequency resources are allocated for a physical downlink control channel (PDCCH).

7. The method of claim 1, wherein the set of time and frequency resources allocated for a data transmission excludes resources outside of the one or more control resource regions.

8. The method of claim 1, wherein the set of time and frequency resources allocated for a data transmission comprises resources within the one or more control resource regions and resources outside of any control resource regions.

9. The method of claim 1, wherein a frequency range of the resources within the one or more control resource regions is one of the same as a frequency range of the resources outside of the one or more control resource regions and different than a frequency range of the resources outside of the one or more control resource regions.

10. A wireless device comprising processing circuitry, the processing circuitry operable to:
receiving a signal from a network node indicating a set of time and frequency resources allocated for a data transmission, wherein a first subset of the indicated set of time and frequency resources allocated for the data transmission overlap with time and frequency resources in one or more control regions, the signal further indicating a second subset of time and frequency resources from the one or more control resource regions excluded for the data transmission; and
transmitting data based on the received signal.

11. A method in a network node, the method comprising:
determining a set of time and frequency resources allocated for a data transmission, wherein a first subset of the set of time and frequency resources allocated for the data transmission overlap with time and frequency resources in one or more control regions; and
transmitting a signal indicating the set of time and frequency resources allocated for a data transmission to a wireless device, the signal further indicating a second subset of time and frequency resources from the one or more control resource regions excluded for the data transmission.

12. The method of claim 11, wherein the signal is a physical downlink control channel (PDCCH).

13. The method of claim 11, wherein the signal comprises a bitmap for indicating the second subset of time and frequency resources from the one or more control resource regions excluded from the data transmission.

14. The method of claim 11, wherein the signal comprises an identifier of at least one control resource region excluded from the data transmission.

15. The method of claim 11, wherein the one or more control resource regions correspond to one or more Control Resource Sets (CORESETs).

16. The method of claim 11, wherein the second subset of time and frequency resources are allocated for a physical downlink control channel (PDCCH).

17. The method of claim 11, wherein the set of time and frequency resources allocated for a data transmission excludes resources outside of the one or more control resource regions.

18. The method of claim 11, wherein the set of time and frequency resources allocated for a data transmission comprises resources within the one or more control resource regions and resources outside of any control resource regions.

19. The method of claim 11, wherein a frequency range of the resources within the one or more control resource regions is one of the same as a frequency range of the resources outside of the one or more control resource regions and different than a frequency range of the resources outside of the one or more control resource regions.

* * * * *